US012547616B2

(12) United States Patent
Thai et al.

(10) Patent No.: US 12,547,616 B2
(45) Date of Patent: Feb. 10, 2026

(54) SEMANTIC REASONING FOR TABULAR QUESTION ANSWERING

(71) Applicant: ADOBE INC., San Jose, CA (US)

(72) Inventors: Dung Thai, Amherst, MA (US); Doo Soon Kim, San Jose, CA (US); Franck Dernoncourt, San Jose, CA (US); Trung Bui, San Jose, CA (US)

(73) Assignee: ADOBE INC., San Jose, CA (US)

(*) Notice: Subject to any disclaimer, the term of this patent is extended or adjusted under 35 U.S.C. 154(b) by 1016 days.

(21) Appl. No.: 17/317,052

(22) Filed: May 11, 2021

(65) Prior Publication Data
US 2022/0374426 A1    Nov. 24, 2022

(51) Int. Cl.
*G06F 16/2452* (2019.01)
*G06F 16/22* (2019.01)
*G06F 40/30* (2020.01)
*G06N 3/042* (2023.01)
*G06N 3/08* (2023.01)

(52) U.S. Cl.
CPC .... *G06F 16/24522* (2019.01); *G06F 16/2264* (2019.01); *G06F 40/30* (2020.01); *G06N 3/042* (2023.01); *G06N 3/08* (2013.01)

(58) Field of Classification Search
CPC .......... G06N 3/08; G06N 3/042; G06F 40/30; G06F 16/2264; G06F 16/2452
See application file for complete search history.

(56) References Cited

U.S. PATENT DOCUMENTS

| 2020/0242444 | A1* | 7/2020 | Zhang | G06N 3/042 |
| 2022/0067281 | A1* | 3/2022 | Hu | G06F 40/30 |
| 2022/0101052 | A1* | 3/2022 | Canim | G06F 17/18 |
| 2022/0309087 | A1* | 9/2022 | Müller | G06N 3/08 |

OTHER PUBLICATIONS

Herzig et al., "TAPAS: Weakly Supervised Table Parsing via Pre-training," 2020, Proceedings of the 58th Annual Meeting of the Association for Computational Linguistics (Year: 2020).*
Yin et al., "TABERT: Pretraining for Joint Understanding of Textual and Tabular Data," May 2020, arXiv: 2005.08314v1 (Year: 2020).*
Pal et al., "Data Agnostic ROBERTa-based Natural Language to SQL Query Generation," Mar. 2021, arXiv:2010.05243v3 (Year: 2021).*

(Continued)

*Primary Examiner* — Michael J Huntley
*Assistant Examiner* — Vincent Anton Spraul
(74) *Attorney, Agent, or Firm* — F. CHAU & ASSOCIATES, LLC

(57) ABSTRACT

Systems and methods for natural language processing are described. One or more embodiments of the present disclosure receive a query related to information in a table, compute an operation selector by combining the query with an operation embedding representing a plurality of table operations, compute a column selector by combining the query with a weighted operation embedding, compute a row selector based on the operation selector and the column selector, compute a probability value for a cell in the table based on the row selector and the column selector, where the probability value represents a probability that the cell provides an answer to the query, and transmit contents of the cell based on the probability value.

19 Claims, 10 Drawing Sheets

(56) References Cited

OTHER PUBLICATIONS

Arik et al., "TabNet: Attentive Interpretable Tabular Learning," 2020, arXiv:1908.07442v5 (Year: 2020).*

Bai et al., "Enhanced Natural Language Interface for Web-Based Information Retrieval," 2020, doi.org/10.1109/ACCESS.2020.3048164 (Year: 2020).*

Iyyer, et al., "Search-based Neural Structured Learning for Sequential Question Answering", In Proceedings of the 55th Annual Meeting of the Association for Computational Linguistics (Volume 1: Long Papers), vol. 1, pp. 1821-1831, 2017.

Krishnamurthy, et al., "Neural Semantic Parsing with Type Constraints for Semi-Structured Tables", In Proceedings of the 2017 Conference on Empirical Methods in Natural Language Processing, pp. 1516-1526.

Neelakantan, et al., "Learning a Natural Language Interface With Neural Programmer", arXiv preprint arXiv:1611.08945v4 [cs.CL] Mar. 2, 2017, 13 pages.

Pasupat, et al., "Compositional Semantic Parsing on Semi-Structured Tables", arXiv preprint arXiv:1508.00305v1 [cs.CL] Aug. 3, 2015, 11 pages.

Liang, et al., "Memory Augmented Policy Optimization for Program Synthesis and Semantic Parsing", arXiv preprint arXiv:1807.02322v5 [cs.LG] Jan. 13, 2019, 17 pages.

* cited by examiner

SEMANTIC REASONING FOR TABULAR QUESTION ANSWERING

BACKGROUND

The following relates generally to natural language processing, and more specifically to question answering.

Natural language processing (NLP) refers to using computers to interpret natural language (i.e., language as spoken by humans). In some cases, NLP tasks involve assigning annotation data such as grammatical information to words or phrases within a natural language expression. A variety of machine learning algorithms have been applied to NLP tasks.

Question answering is a subtask of NLP related to answer natural language queries based on a knowledge base. A large amount of information, statistics and reports are stored in databases or tables. These tables can include helpful information for answering input queries.

However, conventional question answering systems are limited to simple exact matching of a question and contents of a table. In addition, the number of columns and rows that these systems can effectively support is limited. Therefore, there is a need in the art for improved question answering systems that are more flexible and can support variable size tables.

SUMMARY

The present disclosure describes systems and methods for natural language processing. Some embodiments of the disclosure include a question answering apparatus configured to generate an answer based on an input question and data from a table. For example, a machine learning model (i.e., a question answering network) may be used to compute a probability that a cell in the table provides an answer to the question. The probability is computed based on a row selector, a column selector, and an operation selector. In some embodiments, the question answering network includes an attention network with multiple attention heads.

A method, apparatus, and non-transitory computer readable medium for natural language processing are described. One or more embodiments of the method, apparatus, and non-transitory computer readable medium include receiving a query related to information in a table, computing an operation selector by combining the query with an operation embedding representing a plurality of table operations, computing a column selector by combining the query with a weighted operation embedding, computing a row selector based on the operation selector and the column selector, computing a probability value for a cell in the table based on the row selector and the column selector, wherein the probability value represents a probability that the cell provides an answer to the query, and transmitting contents of the cell based on the probability value.

An apparatus and method for natural language processing are described. One or more embodiments of the apparatus and method include an operation selector network configured to compute an operation selector based on a query and an operation embedding representing a plurality of table operations, a column selector network configured to compute a column selector based on the operation selector, an operation network configured to execute an operation on a table and produce an operation output, a row selector component configured to compute a row selector based on the operation selector and the column selector, and an answer component configured to compute a probability value for a cell in the table based on the row selector and the column selector, wherein the probability value represents a probability that the cell provides an answer to the query.

A method, apparatus, and non-transitory computer readable medium for training a neural network are described. One or more embodiments of the method, apparatus, and non-transitory computer readable medium include identifying a training set comprising a query related to information in a table, and a ground-truth answer to the query, computing an operation selector based on the query and an operation embedding representing a plurality of table operations, computing a column selector based on the operation selector, computing a row selector based on the operation selector and the column selector, computing a probability value for a cell in the table based on the row selector and the column selector, computing a loss function based on the probability value and the ground truth answer, and updating parameters of a neural attention network based on the loss function.

DETAILED DESCRIPTION

Figure 1:
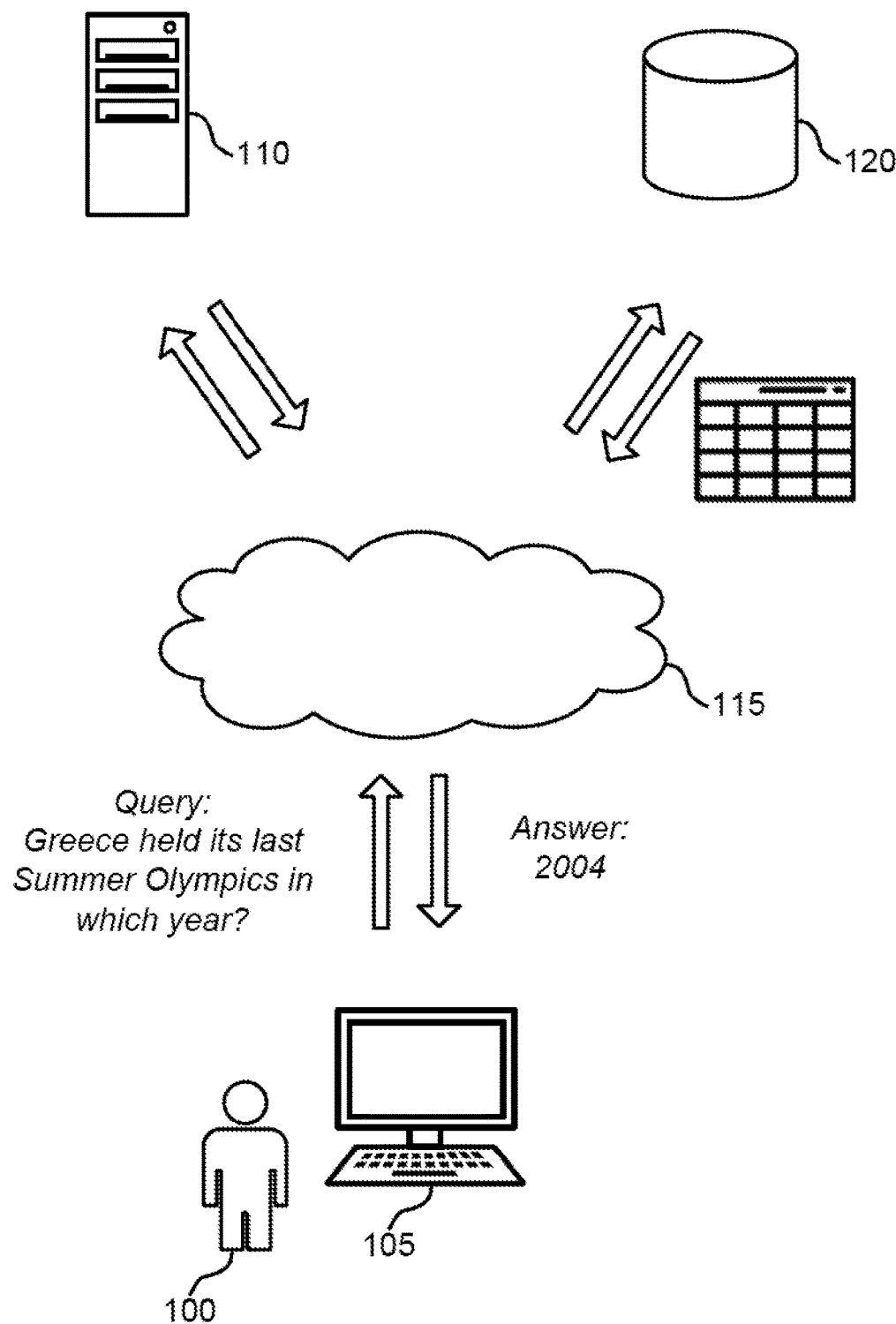
FIG. 1 shows an example of a dialog system according to aspects of the present disclosure.

The present disclosure describes systems and methods for natural language processing. Some embodiments of the disclosure include a question answering apparatus configured to generate an answer based on an input question and data from a table. For example, a machine learning model (i.e., a question answering network) may be used to compute a probability that a cell in the table provides an answer to the question. The probability is computed based on a row selector, a column selector, and an operation selector. In some embodiments, the question answering network includes an attention network with multiple attention heads.

A large amount of information is stored in the form of a table. However, accessing this information can require specialized knowledge such as knowledge of a query language, and knowledge about the contents of the table. In some cases, accessing information from a table involves performing multiple table operations, such as filtering the rows or columns of data, or joining data from different parts of the table (or from different tables).

Conventional programming languages (e.g., SQL) are not adaptive to table headers (which can vary from table to table). For example, each document or table from a database may have a different schema or formatting. In some cases, neural networks have been used to compose programming operations (i.e., neural programming). A neural programmer may be used to access table data by composing a sequence of table operations. However, conventional neural programming models compose individual atomic programming steps. However, this approach becomes inefficient for large table sizes, and can produce inaccurate results when there is ambiguity about the meaning of the query (or of the content of the table). As a result, conventional neural programming models are limited to simple exact matching of the question and the table content.

One or more embodiments of the present disclosure include a question answering apparatus that uses attention-based mechanism and semantic matching to provide matching scores for table contents. According to some embodiments, a neural programming model is used in which each step composed by the neural programmer represents a probabilistic distribution over multiple table operations instead of being limited to a single operation. In some cases, an attention mechanism with multiple attention heads is used to maintain and prioritize multiple execution paths.

By applying the unconventional step of using a neural programming model in which each execution step represents a distribution over multiple table operations, embodiments of the present disclosure can perform efficient and scalable question answering, even in cases where there is semantic ambiguity about the query or the contents of the table. Embodiments of the present disclosure are robust to paraphrasing and out-of-vocabulary entities words from the questions and tables contents.

Embodiments of the present disclosure may be used in the context of a computer dialog application. For example, a question answering network based on the present disclosure may be used to compute a probability that a cell of a table provides an answer to a natural language question that arises in a dialog. A dialog response may be generated based on the calculated probability. An example application in the computer dialog context is provided with reference to FIGS. 1, 2 and 3. Details regarding the architecture of an example question answering apparatus are provided with reference to FIGS. 4, 5, and 6. Examples of a process for question answering are provided with reference to FIGS. 7, 8, and 9. A description of an example training process is described with reference to FIG. 10.

Dialog System

FIG. 1 shows an example of a dialog system according to aspects of the present disclosure. The example shown includes user 100, user device 105, question answering apparatus 110, cloud 115, and database 120.

In the example of FIG. 1, the user 100 provides a query to question answering apparatus 110, e.g., using a user device 105 communicating via the cloud 115. Question answering apparatus 110 may have access to information in a table stored in a database 120. For example, the query may be the natural language question "Greece held its last Summer Olympics in which year?" In this example, the question answering network identifies a cell of the table that includes an answer to the query ("2004"), and generates a response accordingly.

In some embodiments, question answering apparatus 110 includes a trained question answering network, which computes a row selector, a column selector, and an operation selector (e.g., select, argmax, print, etc.). In some examples, the question answering network computes multiple steps in the neural programming model. The result of each step may include probability values that different cells in the table represent the answer to the query.

Accordingly, question answering apparatus 110 computes a probability value for a cell in the table based on the row selector and the column selector, where the probability value represents a probability that the cell provides an answer to the query. Then, the question answering apparatus 110 signals the contents of the cell (e.g., "2004") based on the probability value and returns the answer to the user 100.

The user device 105 may be a personal computer, laptop computer, mainframe computer, palmtop computer, personal assistant, mobile device, or any other suitable processing apparatus. In some examples, the user device 105 includes software that incorporates a question answering application (e.g., a dialog system). The question answering application may either include or communicate with the question answering apparatus 110.

The question answering apparatus 110 includes a computer implemented network comprising an operation selector network, a column selector network, an operation network, a row selector component, and an answer component. The network receives a query related to information in a table. The network computes an operation selector using an operation selector network by combining the query with an operation embedding representing a plurality of table operations. The network computes a column selector using a column selector network by combining the query with a weighted operation embedding. The network computes a row selector using a row selector component based on the operation selector and the column selector. The network computes a probability value for a cell in the table using an answer component based on the row selector and the column selector, wherein the probability value represents a probability that the cell provides an answer to the query. Additionally, the network transmits contents of the cell based on the probability value.

The question answering apparatus 110 may also include a processor unit, a memory unit, and a training component. The training component is used to train the question answering network. Additionally, the question answering apparatus 110 can communicate with the database 120 via the cloud 115. In some cases, the architecture of the question answering network is also referred to as a network model or a network. Further detail regarding the architecture of the question answering apparatus 110 is provided with reference to FIGS. 4, 5, and 6. Further detail regarding the operation of the question answering apparatus 110 is provided with reference to FIGS. 7, 8, and 9.

In some cases, the question answering apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some cases, the question answering apparatus 110 is configured to apply natural language processing (NLP) approaches to generate an answer based on an input query and data from a table. NLP refers to techniques for using computers to interpret natural language. In some cases, NLP tasks involve assigning annotation data such as grammatical information to words or phrases within a natural language expression. Different classes of machine-learning algorithms have been applied to NLP tasks. These algorithms may take a set of features generated from the natural language data as input. Some algorithms, such as decision trees, utilize hard if-then rules. Other systems use neural networks or statistical models which make soft, probabilistic decisions based on attaching real-valued weights to input features. These models can express the relative probability of multiple answers.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud is available to many organizations. In one example, a cloud includes a multi-layer communications network comprising multiple edge routers and core routers. In another example, a cloud is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
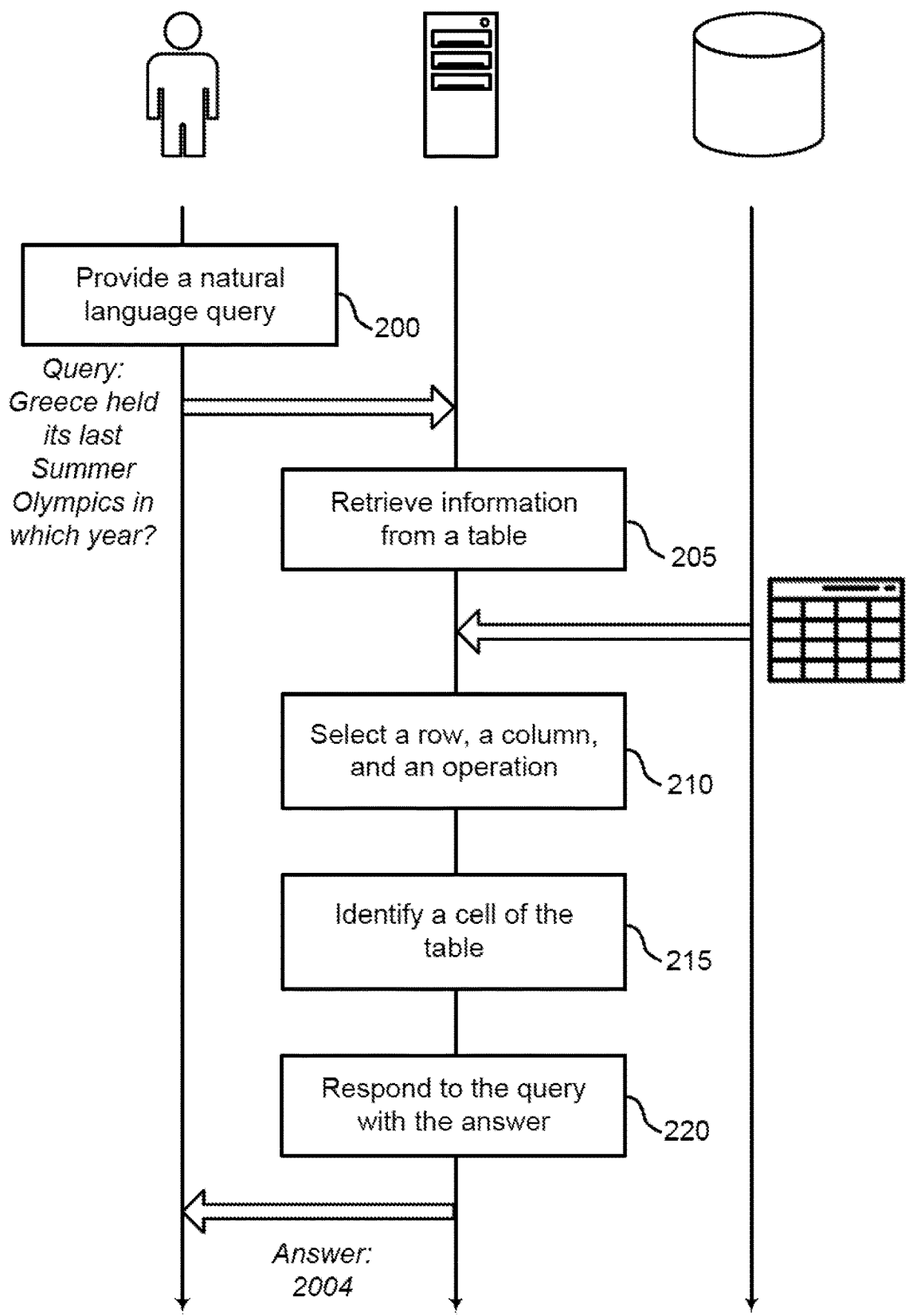
FIG. 2 shows an example of question answering process according to aspects of the present disclosure.

FIG. 2 shows an example of question answering process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 200, the system provides a natural language query. In some cases, the operations of this step refer to, or may be performed by, a user as described with reference to FIG. 1. As an example, the query is "Greece held its last Summer Olympics in which year?"

At operation 205, the system retrieves information from a table. In some examples, the table is provided by a user or the table is previously stored in a database of the system. The table may be stored in a cloud storage and retrieved by the system. In some cases, the operations of this step refer to, or may be performed by, retrieving information or data from a database as described with reference to FIG. 1.

A large amount of information, statistics and reports are stored in databases or semi-structured tables (e.g., tables from Adobe® Document Cloud or PDFs). Similarly, customer purchase and click data are stored on merchant websites or product specification sheets (e.g., Adobe® Experience Manager). In some examples, the input table is a flat table or a semi-structured table. The semi-structured tables may be used to answer questions about a product, a company's business, etc. In some cases, expert knowledge is needed to write a specific query for each question given a table.

In some examples, the table headers and cells are encoded by concatenating their word embeddings and knowledge graph embeddings trained using an energy-based model (e.g., TransE model).

At operation 210, the system selects a row, a column, and an operation of the table. In some cases, the operations of this step refer to, or may be performed by, a question answering network as described with reference to FIGS. 4 and 9. Conventionally, a user writes a query using a query programming language (e.g., SQL) where codes are executed to search for an answer to the query based on the table. For example, the computer program may include steps such as at line 1, select the row(s) where Country=Greece. At line 2, argmax (year). At line 3, print (year).

At operation 215, the system identifies a cell of the table as an answer to the query. In some cases, the operations of this step refer to, or may be performed by, a question answering network as described with reference to FIGS. 4 and 9. In some examples, the system identifies one or more cells as an answer to the query. The system computes a probability value for a cell in the table based on the row selector and the column selector, and the probability value represents a probability that the cell provides an answer to the query.

At operation 220, the system responds to the query with the answer. In some cases, the operations of this step refer to, or may be performed by, a dialog application implemented on a user device as described with reference to FIG. 1. According to the example above, the system provides an answer to the query, "2004" (i.e., in year 2004). Therefore, the user would understand Greece held its last Summer Olympics in 2004. In some cases, the user can modify the query and the system generates an updated response based on the modified query. Additionally or alternatively, data from the table may be updated and the system generates an updated response to a query based on the updated table.

Figure 3:
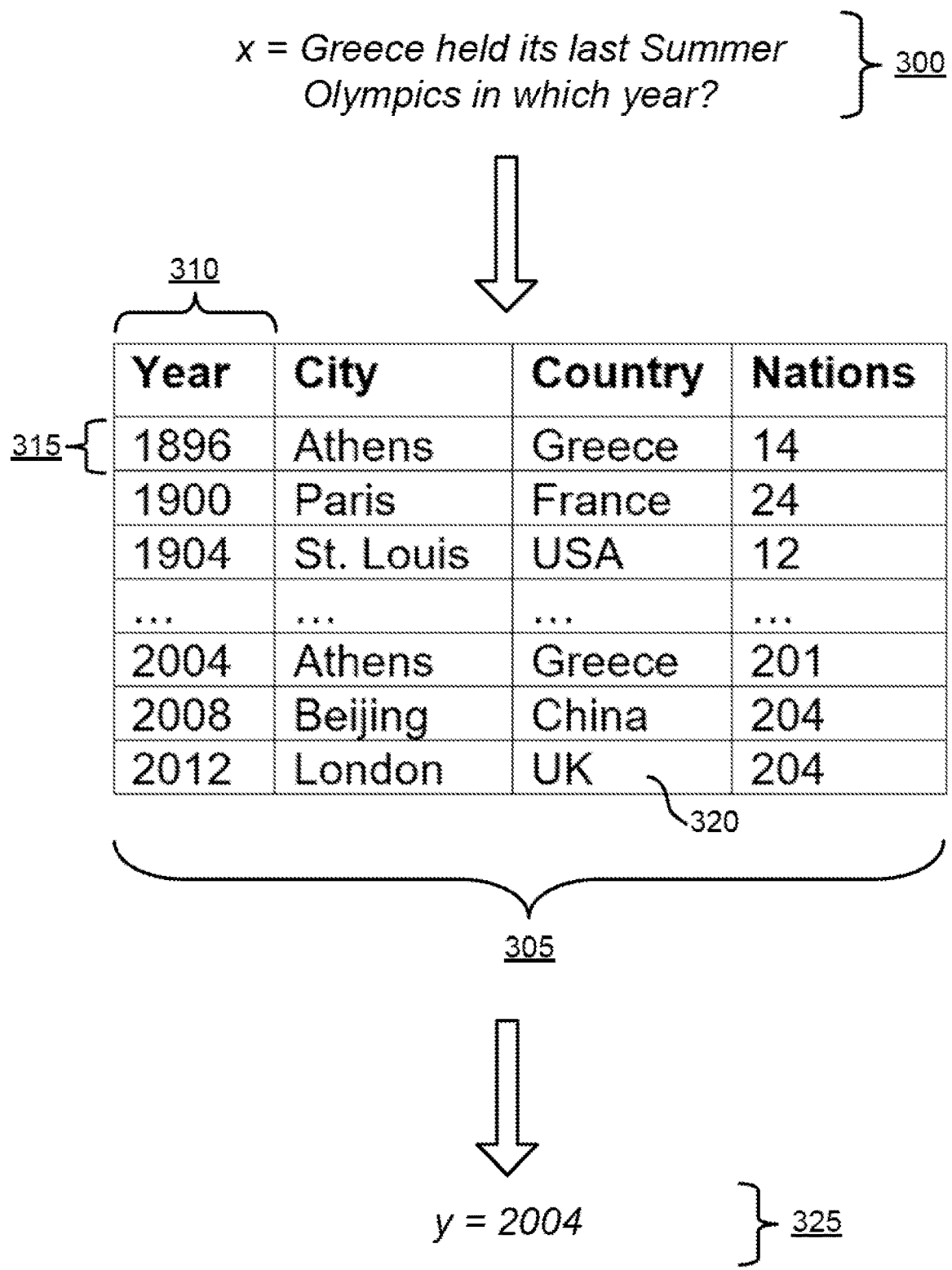
FIG. 3 shows an example of tabular question answering according to aspects of the present disclosure.

FIG. 3 shows an example of tabular question answering according to aspects of the present disclosure. The example shown includes query 300, table 305, and answer 325. The question answering apparatus as described in FIG. 1 is able to answer questions regarding information from tables. In an embodiment, (question, table) pair are input to the question answering apparatus, which outputs one or more answers to the question using information available in the table. In some cases, the question is also referred to as query 300. Query 300 is a natural language question. Table 305 is an example of, or includes aspects of, the corresponding element described with reference to FIG. 9. In one embodiment, table 305 includes column 310, row 315, and cell 320.

At training, the question answering apparatus learns a natural language interface (e.g., a question answering network as described in FIG. 4) for querying data from semi-structured tables. Query 300 is denoted as x, answer 325 is denoted as y. For example, query 300 reads "Greece held its last Summer Olympics in which year?" The trained question answering network then generates answer 325 to query 300. Based on this example, answer 325 is "2004".

In some embodiments, the question answering apparatus includes a neural network z that takes in a question and a table and generates the result. z can be viewed as a mixture of programs conditioned on the question and the table (e.g., a neural programmer or a neural programming network). Pr(z, y|x, t) is parameterized by the neural selectors that compute the operation and column distribution for a fixed number of steps.

Network Architecture

Figure 4:
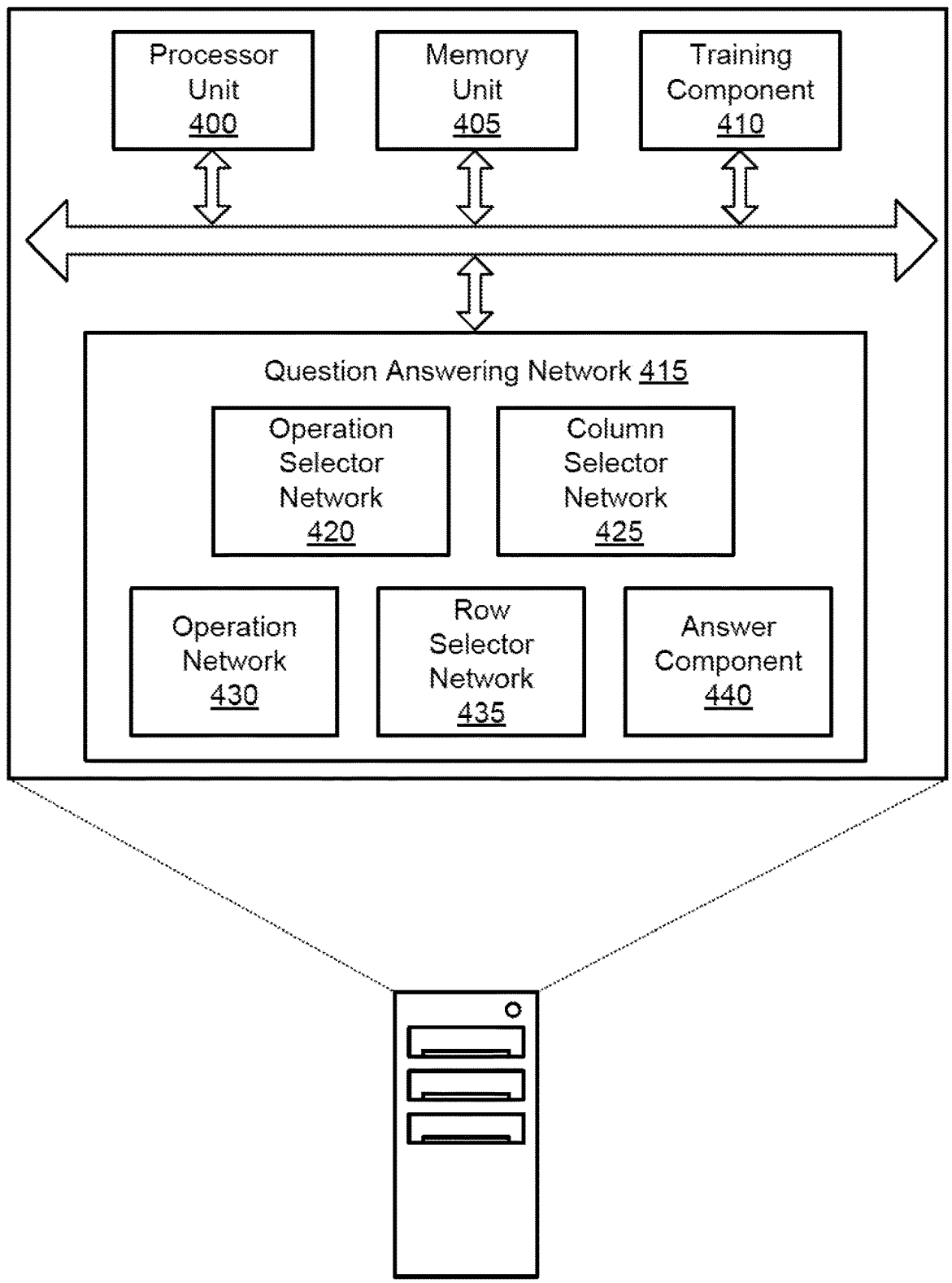
FIG. 4 shows an example of a question answering apparatus according to aspects of the present disclosure.
Figure 5:
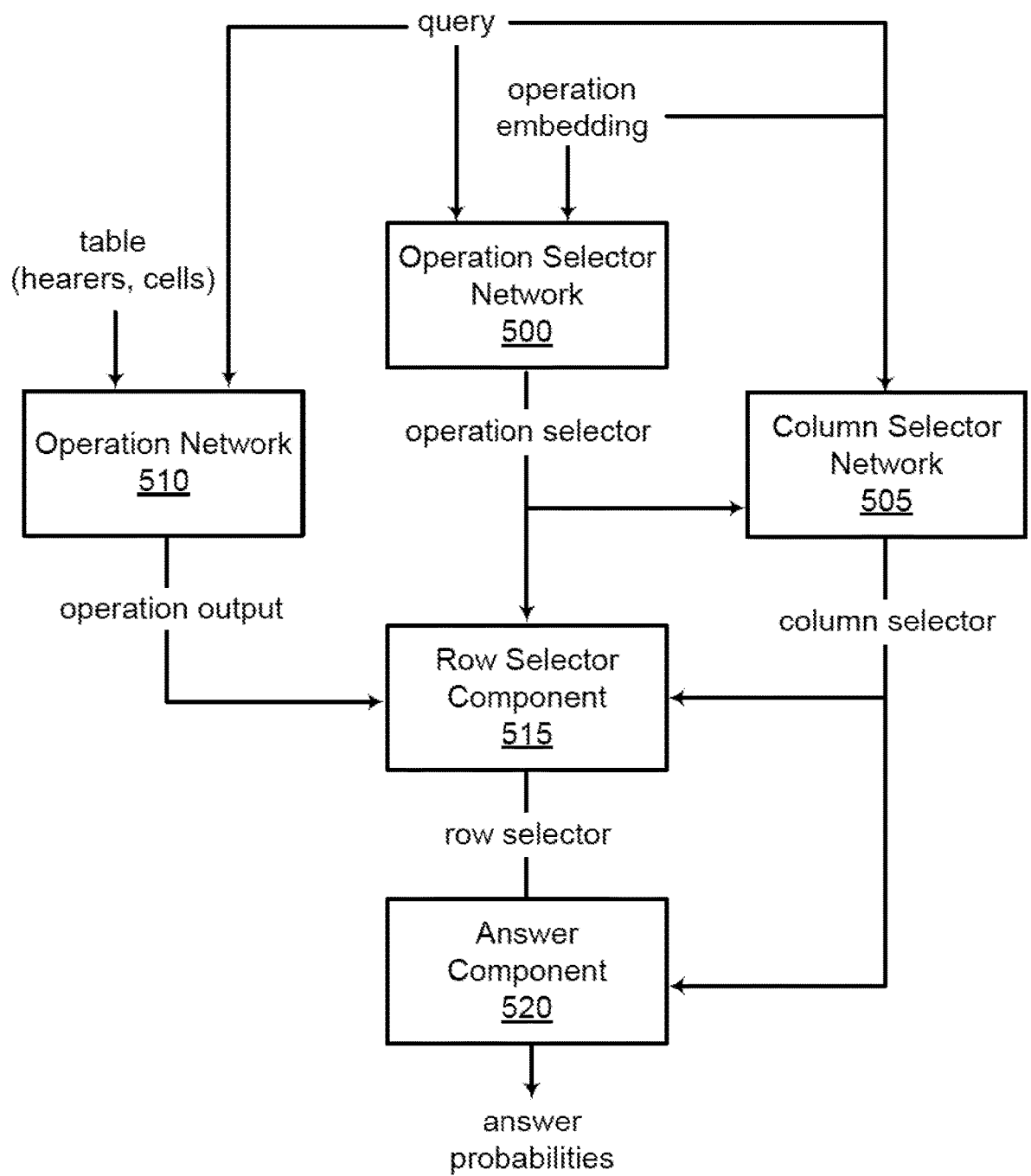
FIG. 5 shows an example of a question answering network according to aspects of the present disclosure.
Figure 6:
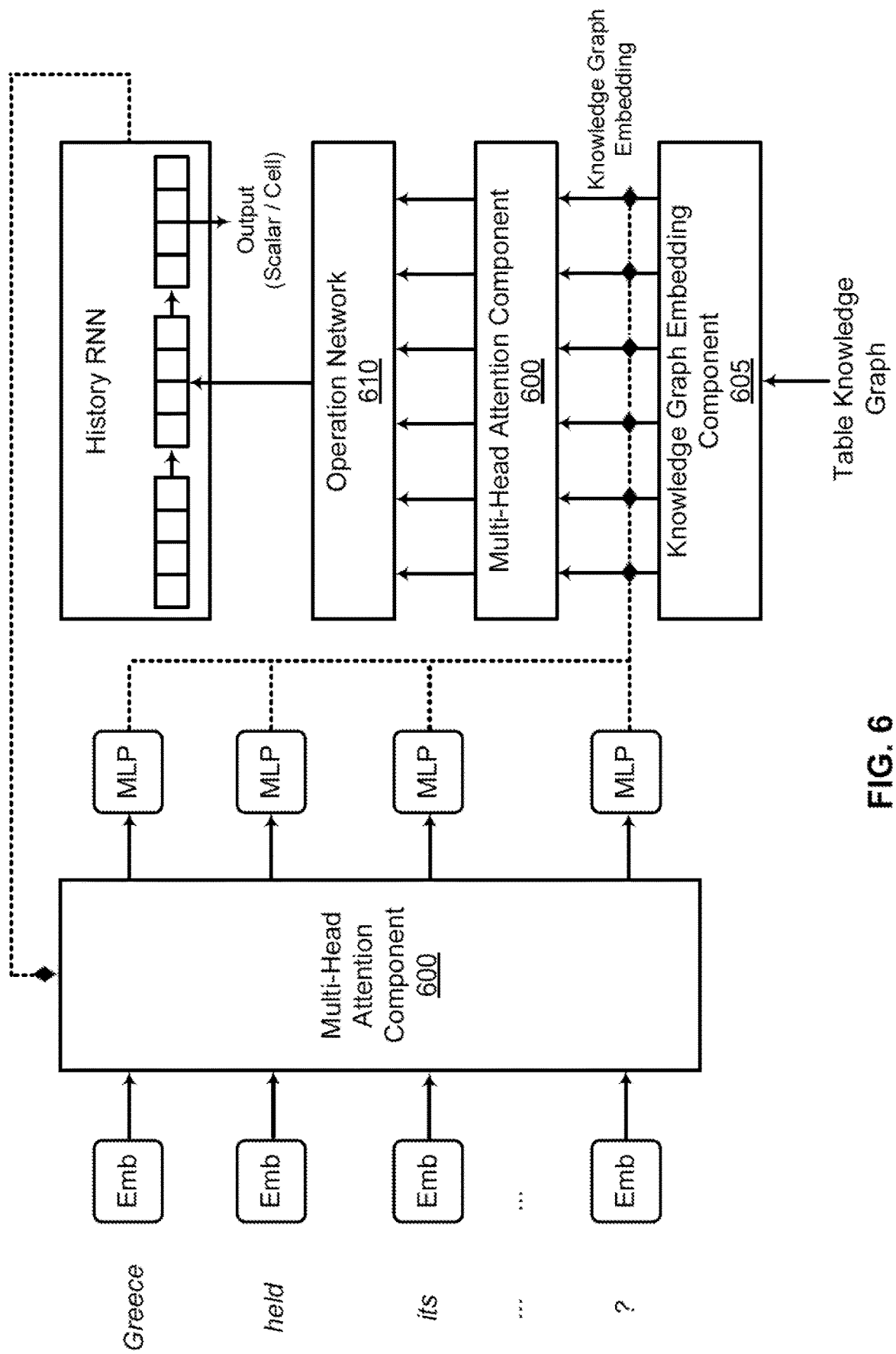
FIG. 6 shows an example of a question answering network including multiple attention heads according to aspects of the present disclosure.

In FIGS. 4-6, an apparatus and method for natural language processing are described. One or more embodiments of the apparatus and method include an operation selector network configured to compute an operation selector based on a query and an operation embedding representing a plurality of table operations, a column selector network configured to compute a column selector based on the operation selector, an operation network configured to execute an operation on a table and produce an operation output, a row selector component configured to compute a row selector based on the operation selector and the column selector, and an answer component configured to compute a probability value for a cell in the table based on the row selector and the column selector, wherein the probability value represents a probability that the cell provides an answer to the query.

Some examples of the apparatus and method described above further include an encoder configured to encode the query to produce an encoded query, wherein the operation selector and the column selector are computed based on the encoded query.

In some examples, the encoder is configured to encode one or more headers and a plurality of cells from the table to produce encoded headers and encoded cells. In some examples, the operation network comprises a first attention head and a second attention head.

In some examples, the first attention head is configured to generate a first attention vector based on the query and one or more headers of the table. In some examples, the second attention head is configured to generate a second attention vector based on the query and a plurality of cells of the table. In some examples, the operation output is based on the first attention vector and the second attention vector.

FIG. 4 shows an example of a question answering apparatus according to aspects of the present disclosure. The example shown includes processor unit 400, memory unit 405, training component 410, and question answering network 415.

A processor unit 400 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 400 is configured to operate a memory array using a memory controller. In other cases, a memory controller is integrated into the processor. In some cases, the processor unit 400 is configured to execute computer-readable instructions stored in a memory to perform various functions. In some embodiments, a processor unit 400 includes special purpose components for modem processing, baseband processing, digital signal processing, or transmission processing.

Examples of a memory unit 405 include random access memory (RAM), read-only memory (ROM), or a hard disk. Examples of memory unit 405 include solid state memory and a hard disk drive. In some examples, a memory unit 405 is used to store computer-readable, computer-executable software including instructions that, when executed, cause a processor to perform various functions described herein. In some cases, the memory unit 405 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 405 store information in the form of a logical state.

According to some embodiments of the present disclosure, the question answering apparatus includes a computer implemented artificial neural network (ANN) that computes a probability value for a cell in the table and responds to a query with an answer based on the probability value. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In some embodiments, the question answering apparatus includes a modified neural programmer that learns a natural language interface for database tables (i.e., task involves deep language understanding and multi-step reasoning). For example, the modified neural programmer is configured to map natural language queries to logical forms or programs that provide the desired response when executed on the database. In some cases, a neural programmer may include a weakly supervised, end-to-end neural network to induce such programs on a real-world dataset. The neural network further comprises built-in discrete operations. The neural network is trained end-to-end with weak supervision of question-answer pairs, and does not depend on domain-specific grammars, rules, or annotations that are important elements in conventional approaches to program induction.

According to some embodiments, training component 410 identifies a training set including a query related to information in a table, and a ground-truth answer to the query. In some examples, training component 410 computes a loss function based on the probability value and the ground truth answer. Training component 410 then updates parameters of a neural attention network based on the loss function.

According to some embodiments, question answering network 415 receives a query related to information in a table. In some examples, question answering network 415 identifies a number of iterations. Question answering network 415 then initiates a program state. Next, question answering network 415 computes an initial operation selector and an initial column selector based on the initial program state at an initial time step. Subsequently, question answering network 415 iterates the program state based on the number of iterations, where the operation selector and the column selector are based on the iteration of the program state. Question answering network 415 is an example of, or includes aspects of, the corresponding element described with reference to FIG. 9. In one embodiment, question answering network 415 includes operation selector network 420, column selector network 425, operation network 430, row selector component 435, and answer component 440.

According to some embodiments, operation selector network 420 computes an operation selector by combining the query with an operation embedding representing a set of table operations. In some examples, the operation selector represents a probability distribution over the set of table operations. In some embodiments, operation selector network 420 is configured to compute an operation selector based on a query and an operation embedding representing a plurality of table operations. In some examples, the operation embedding is a multi-dimensional vector representation of operation op. The set of table operations are designed such that these operations can work with probabilistic row and column selection. One or more table operations are built into the question answering network. Definitions of operations (e.g., sum, count, and, or, etc.) are straightforward, while comparison operations (e.g., greater, lesser) requires a pivot value as input, where the pivot value comes from the query. Operation selector network 420 is an example of, or includes aspects of, the corresponding element described with reference to FIG. 5.

According to some embodiments, column selector network 425 computes a column selector by combining the query with a weighted operation embedding. In some examples, column selector network 425 computes the weighted operation embedding by combining the operation selector and the operation embedding, where the column selector is computed based on the weighted operation embedding. In some examples, the column selector represents a probability distribution over a set of columns of the table.

According to some embodiments, column selector network 425 is configured to compute a column selector based on the operation selector. Column selector network 425 is an example of, or includes aspects of, the corresponding element described with reference to FIG. 5.

According to some embodiments, operation network 430 generates an operation output for each cell of the table. In some examples, operation network 430 generates a first attention vector based on the query and one or more headers of the table. Additionally, operation network 430 generates a second attention vector based on the query and a set of cells of the table, where the operation output is based on the first attention vector and the second attention vector.

According to some embodiments, operation network 430 is configured to execute an operation on a table and produce an operation output. In some examples, the operation network 430 includes a first attention head and a second attention head. In some examples, the first attention head is configured to generate a first attention vector based on the query and one or more headers of the table. In some examples, the second attention head is configured to generate a second attention vector based on the query and a set of cells of the table. In some examples, the operation output is based on the first attention vector and the second attention vector. According to an embodiment, operation network 430 generates an operation output for each cell of the table. Operation network 430 is an example of, or includes aspects of, the corresponding element described with reference to FIG. 5.

According to some embodiments, row selector component 435 computes a row selector based on the operation selector and the column selector. In some examples, row selector component 435 weights the operation output based on the operation selector and the column selector. In some examples, row selector component 435 sums the weighted operation output over an operation index and a column index to produce the row selector. Row selector component 435 is an example of, or includes aspects of, the corresponding element described with reference to FIG. 5.

According to some embodiments, answer component 440 computes a probability value for a cell in the table based on the row selector and the column selector, where the probability value represents a probability that the cell provides an answer to the query. In some examples, answer component 440 transmits contents of the cell based on the probability value. In some examples, answer component 440 responds to the query with the answer to the query based on the probability value. Answer component 440 is an example of, or includes aspects of, the corresponding element described with reference to FIG. 5.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of a question answering network according to aspects of the present disclosure. The example shown includes operation selector network 500, column selector network 505, operation network 510, row selector component 515, and answer component 520.

In some embodiments, the question answering network includes a natural language interface that can efficiently interact with tabular data (e.g., information from one or more tables). One or more embodiments of the present disclosure includes a modified neural programmer applying neural attention mechanisms and semantic matching for table question answering.

As illustrated in FIG. 5, a query and operation embedding are input to operation selector network 500. Operation selector network 500 is an example of, or includes aspects of, the corresponding element described with reference to FIG. 4. Operation selector network 500 generates an operation selector. In an embodiment, operation selector network 500 generates an operation selector at timestep t, which is extracted from encoded question (i.e., an encoded query) conditioned on the previous state of the program. In some examples, the query is a natural language question. The operation selector is subsequently input to column selector network 505 and row selector component 515.

In an embodiment, column selector network 505 generates a column selector, which is extracted from an encoded question (i.e., the query) conditioned on the previous state $s_{t-1}$ of the program. The column selector is input to row selector component 515. Column selector network 505 is an example of, or includes aspects of, the corresponding element described with reference to FIG. 4.

In an embodiment, row selector component 515 generates a row selector based on the operation selector and the column selector. The row selector indicates a probability associated with a row (e.g., i-th row of the table) being selected for the next execution step. Row selector component 515 is an example of, or includes aspects of, the corresponding element described with reference to FIG. 4.

The row selector is then input to answer component 520 to produce answer probabilities. The question answering network responds to the query with an answer to the query based on probability value. Answer component 520 also takes the column selector as input. Answer component 520 is an example of, or includes aspects of, the corresponding element described with reference to FIG. 4.

Operation network 510 takes a table as input and is configured to execute an operation on the table and produce an operation output. In some examples, the table is a flat table or a semi-structured table. The input table includes one or more headers, one or more columns, one or more rows, and one or more cells. Operation network 510 is an example of, or includes aspects of, the corresponding element described with reference to FIG. 4. The operation output generated from operation network 510 is input to row selector component 515.

FIG. 6 shows an example of a question answering network including multiple attention heads according to aspects of the present disclosure. The example shown includes multi-head attention component 600, knowledge graph embedding component 605, and operation network 610. In some examples, the multi-head attention component 600 is included in the operation network 610. According to an embodiment, the multi-head attention component 600 includes a first attention head and a second attention head.

As illustrated in FIG. 6, a query is a natural language question. As an example, the query is "Greece held its last Summer Olympics in which year?" Each word of the query (e.g., "Greece", "held", "its", "?") is converted to a multi-dimensional embedding or representation using a word embedding model (e.g., BERT, GloVe, Word2vec). A word embedding is a learned representation for text where words that have the same meaning have a similar representation. GloVe and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produce a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words. In an example illustrated in FIG. 6, the word embedding for each word of the query is referred to as "Emb".

Word embeddings are then input to multi-head attention component 600. Multi-head attention component 600 produces a set of multi-layers perceptrons (MLPs) based on the word embeddings. An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters).

In some embodiments, the question answering network use multiple attention heads to maintain multiple execution paths. Each attention head maintains a candidate soft-selection over the set of operations. The question answering network computes the output of each soft-selection as a mixture of operations results. Then, the question answering network combines these results by max-pooling which resemble the beam search behavior. Operation network 610 is an example of, or includes aspects of, the corresponding element described with reference to FIGS. 4 and 5. In FIG. 6, solid lines show data flow and dashed lines show attention condition.

In some embodiments, bi-linear attention condition on a question and entities of the question is used over table headers and cells to compute the operation results. The table operations are parameterized using neural attention networks rather than multi-layers perceptron and exact input matching. The table headers and cells are encoded by concatenating their word embeddings and knowledge graph embeddings trained using an energy-based model (e.g., a TransE model). In some examples, a same encoder is used to encode entities located in the query and encode table headers.

From bottom to top of FIG. 6, a table knowledge graph is input to knowledge graph embedding component 605. Knowledge graph embedding component 605 generates knowledge graph embedding, which is then input to multi-head attention component 600. Output from multi-head attention component 600 is input to operation network 610.

Operation network 610 includes a pooling layer. The pooling layer is used for ordering layers within a convolutional neural network that may be repeated one or more times within a neural network model. The pooling layer operates upon each feature map separately to create a new set of the same number of pooled feature maps. Pooling includes selecting a pooling operation. In some cases, the size of the pooling operation is smaller than the size of the feature map. For example, the size of the pooling operation is 2×2 pixels with a stride of two pixels. Average pooling or maximum pooling operation may be used. Output from operation network 610 is input to history RNN.

In an embodiment, a selector module (i.e., an operation selector network and a column selector network) produces two probability distributions at every time step. The operation selector network produces a probability distribution over a set of operations and the column selector network produces a probability distribution over a set of columns. The input to the selector module is obtained by concatenating the last hidden state of the question RNN, the hidden state of the history RNN from the current timestep, and the attention vector obtained by performing soft attention on the question using the history vector. In some cases, hard selection is used at test time. The question answering network includes history RNN modeled by a simple RNN with tanh activations. The history RNN model can store and recall the previous operations, data segments, and columns selected by the question answering network till the current time step. The input to the history RNN model at each time step is the result of concatenating the weighted representations of operations and columns with their corresponding probability distributions produced by the selector module at the previous timestep.

In an embodiment, a question answering network includes question RNN that processes the question and converts the tokens to a distributed representation. A recurrent neural network (RNN) is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

Question Answering Using Neural Programming

Figure 7:
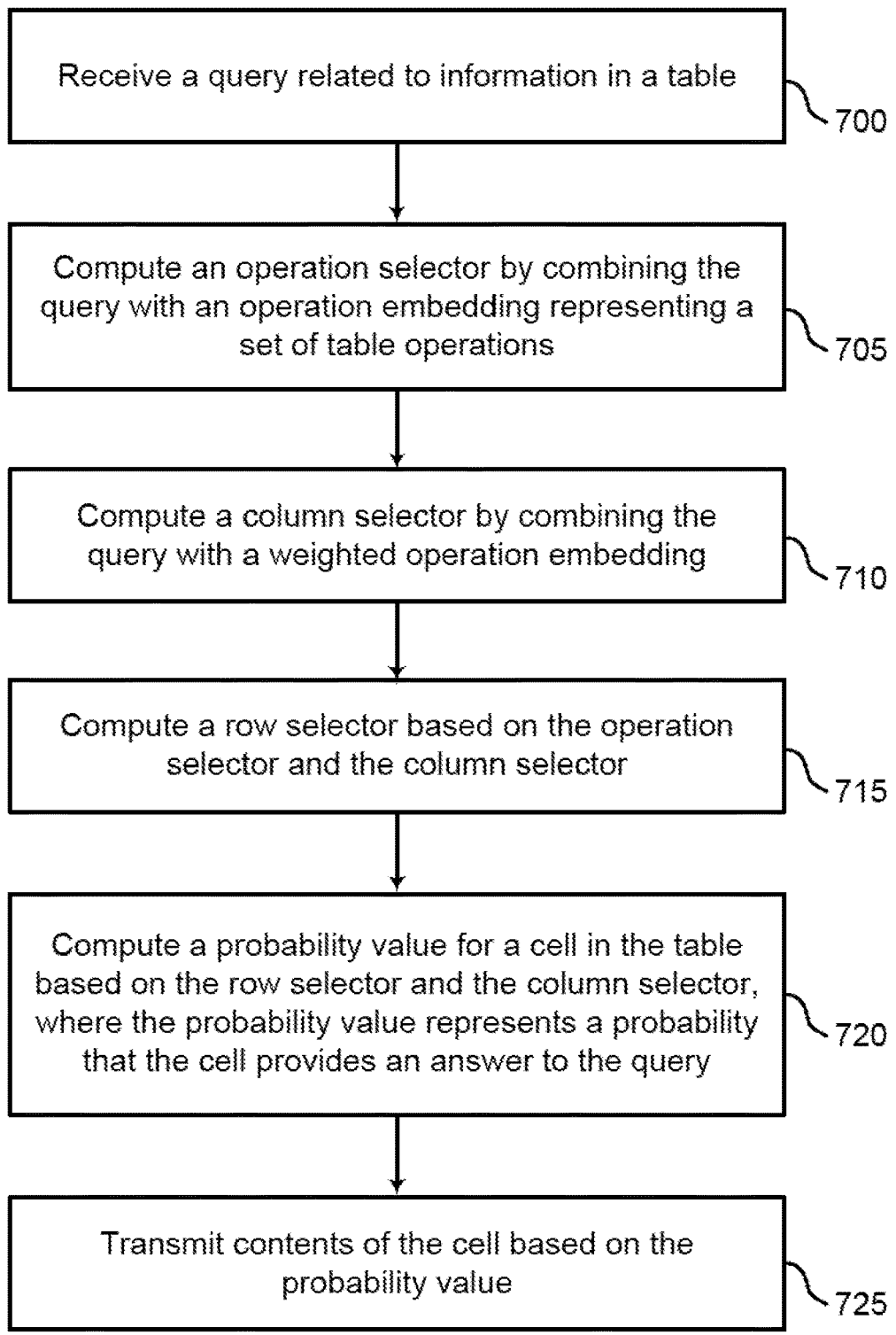
FIG. 7 shows an example of a process for question answering according to aspects of the present disclosure.
Figure 8:
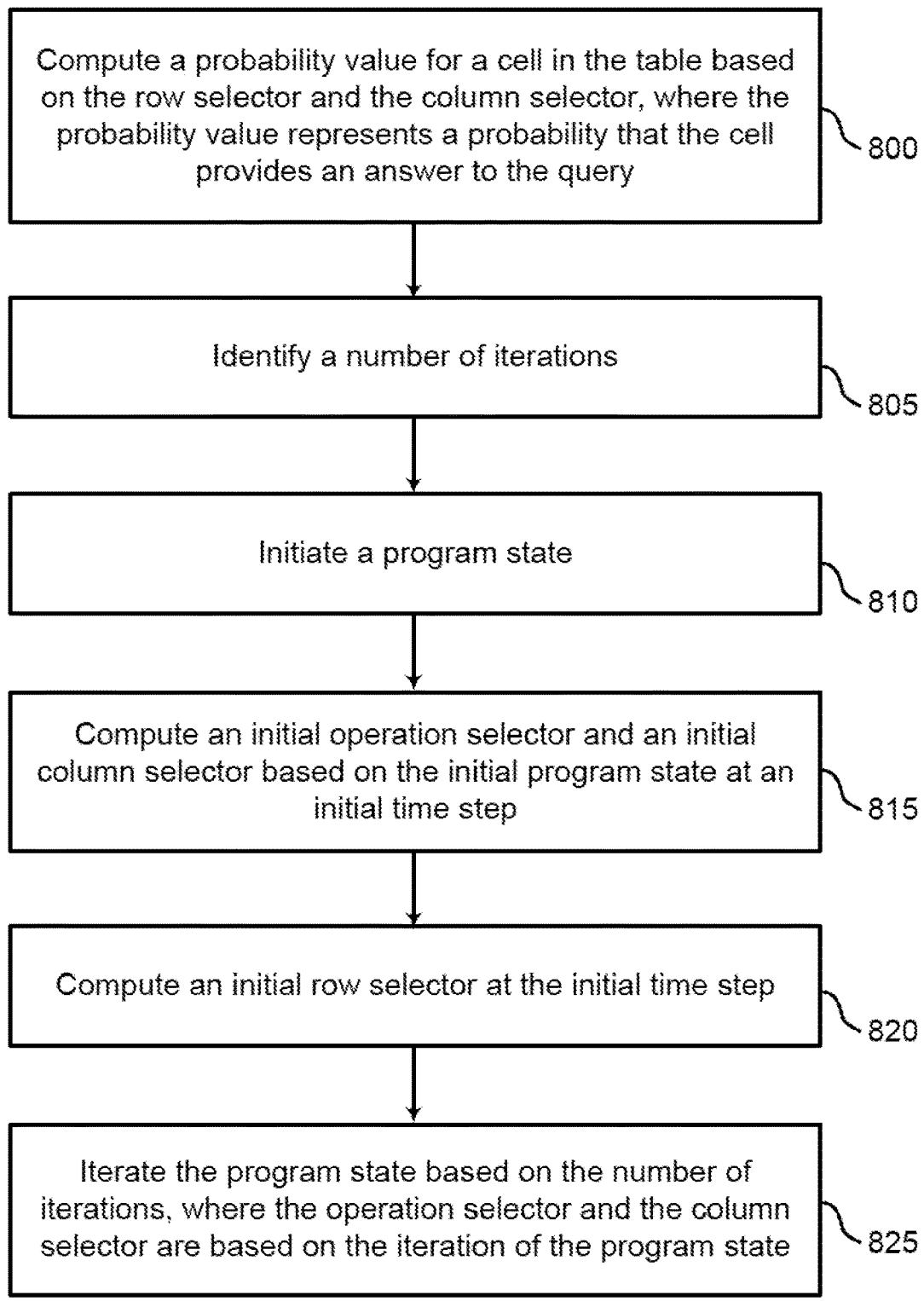
FIG. 8 shows an example of a process for iterating a program state according to aspects of the present disclosure.
Figure 9:
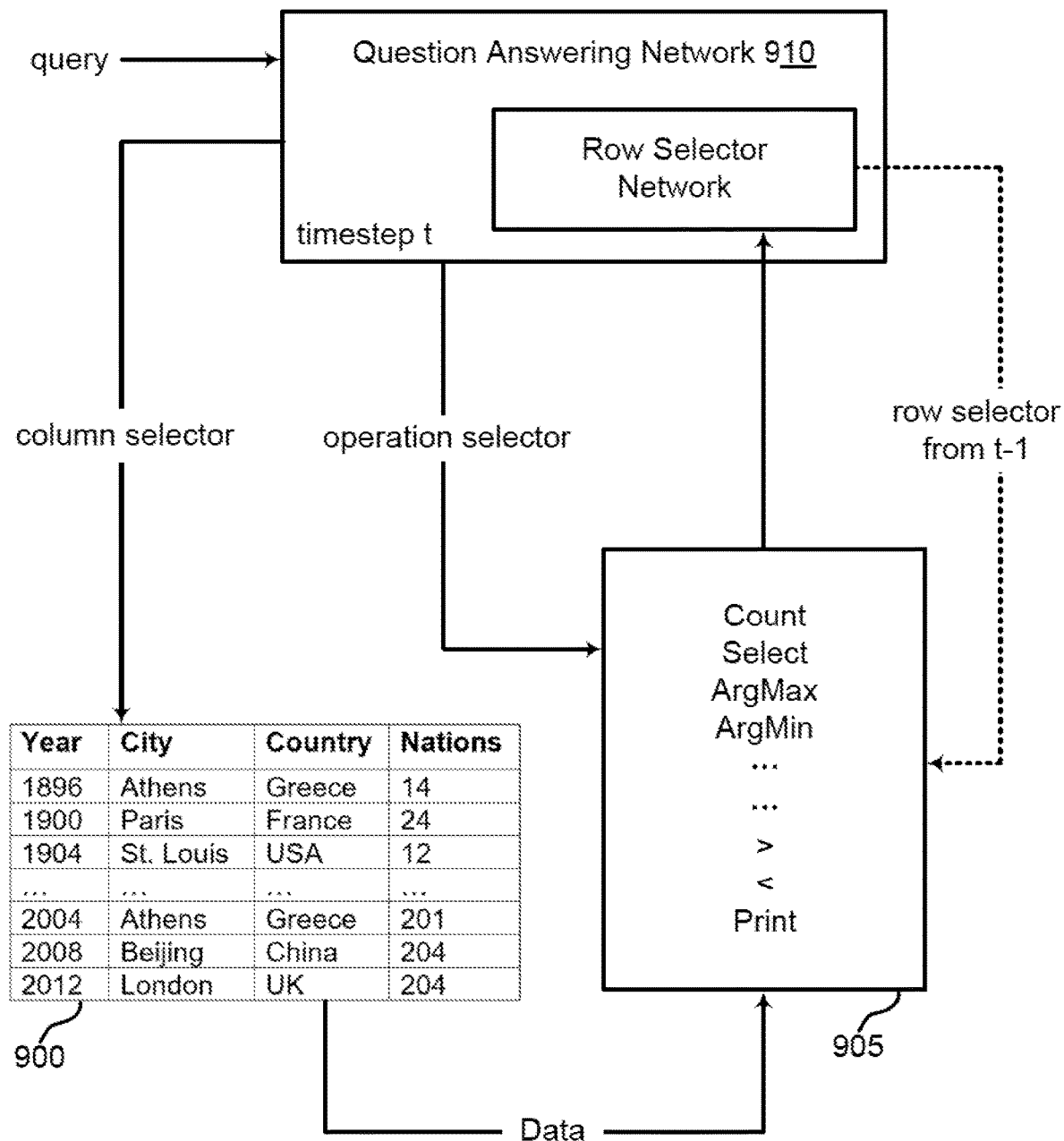
FIG. 9 shows an example of question answering using neural programming according to aspects of the present disclosure.

In accordance with FIGS. 7-9, a method, apparatus, and non-transitory computer readable medium for natural language processing are described. One or more embodiments of the method, apparatus, and non-transitory computer readable medium include receiving a query related to information in a table, computing an operation selector by combining the query with an operation embedding representing a plurality of table operations, computing a column selector by combining the query with a weighted operation embedding, computing a row selector based on the operation selector and the column selector, computing a probability value for a cell in the table based on the row selector and the column selector, wherein the probability value represents a probability that the cell provides an answer to the query, and transmitting contents of the cell based on the probability value.

Some examples of the method, apparatus, and non-transitory computer readable medium described above further include encoding the query to produce an encoded query, wherein the operation selector and the column selector are computed based on the encoded query.

Some examples of the method, apparatus, and non-transitory computer readable medium described above further include computing the weighted operation embedding by combining the operation selector and the operation embedding, wherein the column selector is computed based on the weighted operation embedding.

In some examples, the operation selector represents a probability distribution over the plurality of table operations. In some examples, the column selector represents a probability distribution over a plurality of columns of the table.

Some examples of the method, apparatus, and non-transitory computer readable medium described above further include generating an operation output for each cell of the table. Some examples further include weighting the operation output based on the operation selector and the column selector. Some examples further include summing the weighted operation output over an operation index and a column index to produce the row selector.

Some examples of the method, apparatus, and non-transitory computer readable medium described above further include generating a first attention vector based on the query and one or more headers of the table. Some examples further include generating a second attention vector based on the query and a plurality of cells of the table, wherein the operation output is based on the first attention vector and the second attention vector.

Some examples of the method, apparatus, and non-transitory computer readable medium described above further include encoding the one or more headers and the plurality of cells from the table to produce encoded headers and encoded cells, wherein the first attention vector is computed based on the encoded headers and the second attention vector is computed based on the encoded cells.

Some examples of the method, apparatus, and non-transitory computer readable medium described above further include responding to the query with the answer to the query based on the probability value.

Some examples of the method, apparatus, and non-transitory computer readable medium described above further include identifying a number of iterations. Some examples further include initiating a program state. Some examples further include computing an initial operation selector and an initial column selector based on the initial program state at an initial time step. Some examples further include iterating the program state based on the number of iterations, wherein the operation selector and the column selector are based on the iteration of the program state.

FIG. 7 shows an example of a process for question answering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives a query related to information in a table. In some cases, the operations of this step refer to, or may be performed by, a question answering network as described with reference to FIGS. 4 and 9.

In an embodiment, the system includes generating a latent program for question answering on semi-structured tables. The system includes a question answering network as described in FIG. 4. The input of the question answering network includes a natural language question $q=(x_1, x_2, \ldots, x_T)$ and a flat table $\mathcal{T} = (h, d)$ where h is the column header and d denotes the table cells. In some examples, the table $\mathcal{T}$ is a semi-structured table.

At operation 705, the system computes an operation selector by combining the query with an operation embedding representing a set of table operations. In some cases, the operations of this step refer to, or may be performed by, an operation selector network as described with reference to FIGS. 4 and 5.

The system is configured to learn an averaged execution path by averaging the results of all operations at each reasoning step of a neural programmer for a given query q.

In some examples, the query is a natural language question, provided by a user. At timestep t, an operation selector $\alpha_t^{op}$ and a column selector $\alpha_t^{col}$ are extracted from the encoded question q conditioned on a previous state $s_{t-1}$ of the program. In an embodiment, the operation selector $\alpha_t^{op}$ is formulated as follows:

$$\alpha_t^{op} = \text{softmax}((s_{t-1} \times W_s^{op} q \times W_{op}) \times W_{op\_emb}) \quad (1)$$

According to an embodiment, $W_{op\_emb}$ includes embedding for each of the set of operations. In some examples, parameters of W are pre-trained.

At operation 710, the system computes a column selector by combining the query with a weighted operation embedding. In some cases, the operations of this step refer to, or may be performed by, a column selector network as described with reference to FIGS. 4 and 5. In an embodiment, the column selector $\alpha_t^{col}$ is formulated as follows:

$$\alpha_t^{col} = \text{softmax}(\text{sum}([s_{t-1} \times W_s^{col} q \times W_{col}; W'_{op\_emb}] \times W_{cond\_break})) \quad (2)$$

where the weighted operations (ops) embedding is formulated as: $W'_{op\_emb} = W_{op\_emb}^T \times \alpha_t^{op}$.

At operation 715, the system computes a row selector based on the operation selector and the column selector. In some cases, the operations of this step refer to, or may be performed by, a row selector component as described with reference to FIGS. 4 and 5.

In an embodiment, a row selector $\alpha_t^{row}$ is computed where $\alpha_t^{row}[i]$ is the probability that row i is selected for the next execution step. The row selector $\alpha_t^{row}$ is formulated as follows:

$$\alpha_t^{row}[i] = \sum_{j=1}^{C} \sum_{k=1}^{K} \alpha_t^{col}[j] * \alpha_t^{op}[k] * R^{op}[i][j] \quad (3)$$

where $R^{op} = f(\alpha_{t-1}^{row}, g(\mathcal{T}))$ is result of the operation on table $\mathcal{T}$. In some cases, $R^{op}$ can be generated using an operation network. The operation network is configured to execute an operation on a table and produce an operation output. The operation executions are parameterized by neural attention module formulated as follows:

$$R^{op} = f(\alpha_{t-1}^{row}, g(\mathcal{T})) = f(\alpha_{t-1}^{row}, \text{attention}(q, h), \text{attention}(q, d)) \quad (4)$$

In some embodiments, the operation network includes a first attention head denoted by attention(q, h), and a second attention head denoted by attention(q, d). The first attention head is configured to generate a first attention vector based on the query and one or more headers of the table. The second attention head is configured to generate a second attention vector based on the query and a set of cells of the table. The operation output is based on the first attention vector and the second attention vector.

At operation 720, the system computes a probability value for a cell in the table based on the row selector and the column selector, where the probability value represents a probability that the cell provides an answer to the query. In some cases, the operations of this step refer to, or may be performed by, an answer component as described with reference to FIGS. 4 and 5.

The final result may be computed at the final step as $$y_t = \alpha_t^{op}[\text{"count"}] * R^{count} \quad (5)$$

$$g_t[i][j] = \alpha_t^{col}[j] * \alpha_t^{op}[\text{"print"}] * \alpha_{t-1}^{row}[i] \quad (6)$$

In an embodiment, the system may not estimate the actions sequence. Instead, the system produces an output answer after a number of reasoning steps. In some examples, the number of reasoning steps is a fixed or pre-determined number. According to an embodiment, a classifier (e.g., softmax layer) is used to produce an output that has a highest score and the classifier returns the output as an answer to the query.

At operation 725, the system transmits contents of the cell based on the probability value. In some cases, the operations of this step refer to, or may be performed by, an answer component as described with reference to FIGS. 4 and 5. The operations of this step may also be performed by the user device as described with reference to FIG. 1.

FIG. 8 shows an example of a process for iterating a program state according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 800, the system computes a probability value for a cell in the table based on the row selector and the column selector, where the probability value represents a probability that the cell provides an answer to the query. In some cases, the operations of this step refer to, or may be performed by, an answer component as described with reference to FIGS. 4 and 5.

At operation 805, the system identifies a number of iterations. In some cases, the operations of this step refer to, or may be performed by, a question answering network as described with reference to FIGS. 4 and 9. In some cases, the number of iterations is a fixed or pre-determined number. For example, the system (or the question answering network) runs for a total of T timesteps (e.g., T=4).

At operation 810, the system initiates a program state. In some cases, the operations of this step refer to, or may be performed by, a question answering network as described with reference to FIGS. 4 and 9.

At operation 815, the system computes an initial operation selector and an initial column selector based on the initial program state at an initial time step. In some cases, the operations of this step refer to, or may be performed by, a question answering network as described with reference to FIGS. 4 and 9.

At operation 820, the system computes an initial row selector at the initial time step. In some cases, the operations of this step refer to, or may be performed by, a row selector component as described with reference to FIGS. 4 and 5.

At operation 825, the system iterates the program state based on the number of iterations, where the operation selector and the column selector are based on the iteration of the program state. In some cases, the operations of this step refer to, or may be performed by, a question answering network as described with reference to FIGS. 4 and 9.

In some embodiments, the system is configured to learn an averaged execution path by averaging the results of all operations at each reasoning step for a given query q. At time step t, an operation selector $\alpha_t^{op}$ and a column selector $\alpha_t^{col}$ are extracted from the encoded question q conditioned on the previous state $s_{t-1}$ of the program. In some examples, a total of time steps, T=4.

FIG. 9 shows an example of question answering using neural programming according to aspects of the present disclosure. The example shown includes table 900, operations 905, and question answering network 910. Table 900 is an example of, or includes aspects of, the corresponding element described with reference to FIG. 3. Table 900 includes one or more headers, columns, rows, and cells.

In an embodiment, a question answering network includes a set of discrete operations and runs for a fixed number of time steps, selecting an operation and a column from table 900 at every time step. The induced program transfers information across timesteps using the row selector variable while the output of the network model is stored in scalar answer and lookup answer variables.

The question answering network produces both a program, made up of those operations, and the result of running the program against a given table 800. The operations make use of three variables including row selector, scalar answer, and lookup answer, which are updated at every timestep. The variables (i.e., lookup answer and scalar answer) store answers while row selector is used to propagate information across time steps. As input, the question answering network receives a question (i.e., a query) along with a table. The question answering network runs for a fixed number of time steps, selecting an operation and a column from the table as the argument to the operation at each time step. During training, soft selection is performed so that the question answering network can be trained end-to-end using backpropagation.

According to one or more embodiments, at each time step (e.g., at time step t), the question answering network is configured to compute a distribution over the columns and operations. The operations or actions are grounded by their execution results on the table. A distribution over the selected rows is passed to the next execution step. Question answering network 910 is an example of, or includes aspects of, the corresponding element described with reference to FIG. 4.

As illustrated in FIG. 9, a query is input to question answering network 910. Question answering network 910 includes a row selector network, which is configured to compute a row selector based on an operation selector and a column selector. Question answering network 910 generates a column selector and an operation selector (e.g., at time step t). The column selector includes or produces a probability distribution over columns of table 900 at every time step. Data or information from table 900 is passed to operations 905. For example, a set of operations include count, select, argmax, argmin, print, less than ("<"), greater than (">"). Embodiments of the present disclosure are not limited to the operations mentioned herein. The operation selector includes or produces the probability distribution over the set of operations.

In an embodiment, $\alpha_t^{op}$ and $\alpha_t^{col}$ denote the probability assigned by the operation selector to operation x and by the column selector to column j ($\forall j=1,2,\ldots,C$) at time step t, respectively. In some examples, x∈({sum, count, difference, greater, lesser, and, or, assign, reset}). Question answering network 910 computes or generates the output and row selector variables. The output and row selector variables at a step is obtained by additively combining the output of the individual operations on the different data segments weighted with their corresponding probabilities assigned by the model.

In an embodiment, a row selector network of question answering network 910 produces a row selector t−1 at a previous time step t−1 and a row selector t (i.e., at the present time) is updated based on the row selector t−1.

Training and Evaluation

Figure 10:
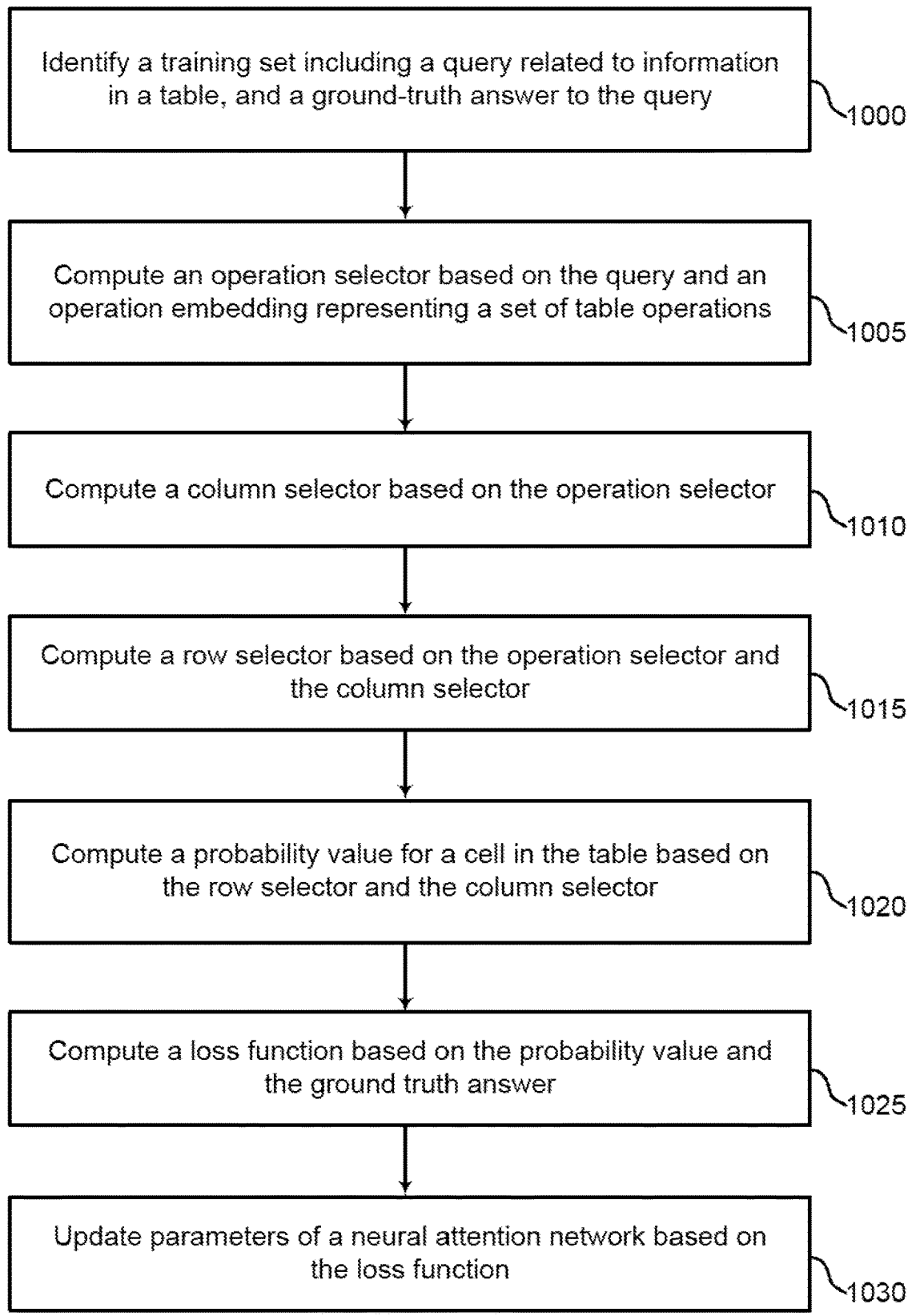
FIG. 10 shows an example of a process for training a question answering network according to aspects of the present disclosure.

In accordance with FIG. 10, a method, apparatus, and non-transitory computer readable medium for training a neural network are described. One or more embodiments of the method, apparatus, and non-transitory computer readable medium include identifying a training set comprising a query related to information in a table, and a ground-truth answer to the query, computing an operation selector based on the query and an operation embedding representing a plurality of table operations, computing a column selector based on the operation selector, computing a row selector based on the operation selector and the column selector, computing a probability value for a cell in the table based on the row selector and the column selector, computing a loss function based on the probability value and the ground truth answer, and updating parameters of a neural attention network based on the loss function.

Some examples of the method, apparatus, and non-transitory computer readable medium described above further include generating an operation output for each cell of the table. Some examples further include weighting the operation output based on the operation selector and the column selector. Some examples further include summing the weighted operation output over an operation index and a column index to produce the row selector.

Some examples of the method, apparatus, and non-transitory computer readable medium described above further include generating a first attention vector based on the query and one or more headers of the table. Some examples further include generating a second attention vector based on the query and a plurality of cells of the table, wherein the operation output is based on the first attention vector and the second attention vector.

Some examples of the method, apparatus, and non-transitory computer readable medium described above further include encoding the one or more headers and the plurality of cells from the table to produce encoded headers and encoded cells, wherein the first attention vector is computed based on the encoded headers and the second attention vector is computed based on the encoded cells. In some examples, each of the encoded headers and each of the encoded cells comprises a word embedding and a knowledge graph embedding.

FIG. 10 shows an example of a process for training a question answering network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

One or more embodiments of the present disclosure use supervised training techniques. Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. in other words, the learning algorithm generalizes from the training data to unseen examples.

Accordingly, during the training process, the parameters and weights of a question answering network are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1000, the system identifies a training set including a query related to information in a table, and a ground-truth answer to the query. In some cases, the operations of this step refer to, or may be performed by, a training component as described with reference to FIG. 4. In some examples, the query is a natural language question. An example training dataset for the question answering network includes a question on a given table and a corresponding answer. In an embodiment, inputs to the system include a table and a question. The output of the system is the corresponding answer. The table includes columns, rows, headers and cells. Each cell of the table may have a value (e.g., content of a cell may include a scalar answer or a non-scalar lookup answer to a query).

At operation 1005, the system computes an operation selector based on the query and an operation embedding representing a set of table operations. In some cases, the operations of this step refer to, or may be performed by, an operation selector network as described with reference to FIGS. 4 and 5. In an embodiment, the operation network is configured to execute an operation on a table and produce an operation output. Operations include at least the following such as count, select, argmax, argmin, greater than (">"), less than ("<"), and print. In some cases, a set of discrete operations such as counting and entry selection may be manually defined. Each operation is parametrized by a real-valued vector that is learned during training.

At operation 1010, the system computes a column selector based on the operation selector. In some cases, the operations of this step refer to, or may be performed by, a column selector network as described with reference to FIGS. 4 and 5. The column selector network is configured to compute a column selector based on the operation selector.

At operation 1015, the system computes a row selector based on the operation selector and the column selector. In some cases, the operations of this step refer to, or may be performed by, a row selector component as described with reference to FIGS. 4 and 5. The row selector component is configured to compute a row selector based on the operation selector and the column selector. The induced program transfers information across timesteps using the row selector variable which contains rows that are selected by the system.

At operation 1020, the system computes a probability value for a cell in the table based on the row selector and the column selector. In some cases, the operations of this step refer to, or may be performed by, an answer component as described with reference to FIGS. 4 and 5.

In an embodiment, $\alpha_t^{op}$ and $\alpha_t^{col}$ denote the probability assigned by the operation selector to an operation x and by the column selector to column j ($\forall j=1, 2, \ldots, C$) at time step t, respectively. In some examples, $x \in (\{sum, count, difference, greater, lesser, and, or, assign, reset\})$. C is the total number of columns of the table. The system computes or generates the output and row selector variables. The output and row selector variables at a time step is obtained by additively combining the output of the individual operations on the different data segments weighted with their corresponding probabilities assigned by the model.

At operation 1025, the system computes a loss function based on the probability value and the ground truth answer. According to an embodiment, masking technique is used when training the question answering network. For example, masking is applied over the table where 1 means a cell or content of the cell provides an answer to the query, and 0 means a cell or content of the cell is not an answer. The masking output is then compared to the ground truth answer. In some cases, the operations of this step refer to, or may be performed by, a training component as described with reference to FIG. 4.

In some examples, a supervised training model may be used that includes a loss function that compares predictions of the question answering network with ground truth training data. The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly, and a new set of predictions are made during the next iteration.

At operation 1030, the system updates parameters of a neural attention network based on the loss function. In some cases, the operations of this step refer to, or may be performed by, a training component as described with reference to FIG. 4. In an embodiment, the parameters of the operations, selector module (i.e., column selector network and operation selector network), question and history RNNs are learned with backpropagation using a weak supervision signal that includes the final answer (i.e., the ground truth answer to the query).

Performance of apparatus, systems and methods of the present disclosure have been evaluated, and results indicate embodiments of the present disclosure have obtained increased performance over existing technology. In some example experiments, the question answering network outperforms conventional neural programmer systems and neural semantic parsers. The present disclosure can be at least applied to extract information from tables, fields filling, and dataset collection.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
receiving a query related to information in a table;
computing, using an operation selector network, an operation selector by combining the query with an operation embedding, wherein the operation selector represents a probability distribution over a plurality of table operations, and wherein the operation selector network receives the query and the operation embedding as input and generates the operation selector;
computing, using a column selector network, a column selector by combining the query with a weighted operation embedding different from the operation embedding, wherein the column selector represents a probability distribution over one or more headers of the table, and wherein the column selector network takes a combination of the query with the weighted operation embedding as input and generates the column selector;
generating, using an operation network, a first attention vector based on a first input and a second attention vector based on a second input different from the first input, wherein the first attention vector is generated using a first attention head of the operation network, the first input includes the query and the one or more headers of the table, the second attention vector is generated using a second attention head of the operation network, and the second input includes the query and a plurality of cells of the table, and wherein the operation network takes the query, the one or more headers of the table, and the plurality of cells of the table as input and generates an operation output based on the first attention vector and the second attention vector;
computing, using a row selector network, a row selector based on the operation selector, the column selector, the first attention vector, and the second attention vector, wherein the row selector network takes the operation selector, the column selector, the operation output as input and generates the row selector;
computing, using an answer component, a probability value for a cell in the table based on the row selector and the column selector, wherein the probability value represents a probability that the cell provides an answer to the query, and wherein the answer component takes the row selector as input and generates the probability value for the cell; and
transmitting contents of the cell based on the probability value.

2. The method of claim 1, further comprising:
encoding the query to produce an encoded query, wherein the operation selector and the column selector are computed based on the encoded query.

3. The method of claim 1, further comprising:
computing the weighted operation embedding by combining the operation selector and the operation embedding, wherein the column selector is computed based on the weighted operation embedding.

4. The method of claim 1, wherein:
the column selector represents a probability distribution over a plurality of columns of the table.

5. The method of claim 1, further comprising:
generating an operation output for each cell of the table;
weighting the operation output based on the operation selector and the column selector; and
summing the weighted operation output over an operation index and a column index to produce the row selector.

6. The method of claim 5, wherein:
the operation output is based on the first attention vector and the second attention vector.

7. The method of claim 1, further comprising:
encoding the one or more headers and the plurality of cells from the table to produce encoded headers and encoded cells, wherein the first attention vector is computed based on the encoded headers and the second attention vector is computed based on the encoded cells.

8. The method of claim 1, further comprising:
responding to the query with the answer to the query based on the probability value.

9. The method of claim 1, further comprising:
identifying a number of iterations;
initiating a program state;
computing an initial operation selector and an initial column selector based on the initial program state at an initial time step; and
iterating the program state based on the number of iterations, wherein the operation selector and the column selector are based on the iteration of the program state.

10. An apparatus for natural language processing, comprising:
at least one processor;
at least one memory including instructions executable by the at least one processor;
an operation selector network configured to compute an operation selector based on a query and an operation, wherein the operation selector represents a probability distribution over a plurality of table operations, and wherein the operation selector network receives the query and an operation embedding as input and generates the operation selector;
a column selector network configured to compute a column selector based on the operation selector, wherein the column selector represents a probability distribution over one or more headers of a table, and wherein the column selector network takes a combination of the query with a weighted operation embedding as input and generates the column selector;
an operation network configured to execute the operation on the table and produce an operation output, wherein a first attention head of the operation network generates a first attention vector based on a first input, wherein a second attention head of the operation network generates a second attention vector based on a second input different from the first input, wherein the first input includes the query and the one or more headers of the table, and wherein the second input includes the query and a plurality of cells of the table, and wherein the operation network takes the query, the one or more headers of the table, and the plurality of cells of the table as input and generates the operation output based on the first attention vector and the second attention vector;

a row selector network configured to compute a row selector based on the operation selector, the column selector, the first attention vector, and the second attention vector, wherein the row selector network takes the operation selector, the column selector, the operation output as input and generates the row selector; and an answer component configured to compute a probability value for a cell in the table based on the row selector and the column selector, wherein the probability value represents a probability that the cell provides an answer to the query, and wherein the answer component takes the row selector as input and generates the probability value for the cell.

11. The apparatus of claim 10, further comprising:
an encoder configured to encode the query to produce an encoded query, wherein the operation selector and the column selector are computed based on the encoded query.

12. The apparatus of claim 11, wherein:
the encoder is configured to encode the one or more headers and the plurality of cells from the table to produce encoded headers and encoded cells.

13. The apparatus of claim 10, wherein:
the operation network comprises the first attention head and the second attention head.

14. The apparatus of claim 10, wherein:
the operation output is based on the first attention vector and the second attention vector.

15. A method for training a neural network, comprising:
identifying a training set comprising a query related to information in a table, and a ground-truth answer to the query;

computing, using an operation selector network, an operation selector based on the query and an operation embedding, wherein the operation selector represents a probability distribution over a plurality of table operations, and wherein the operation selector network receives the query and the operation embedding as input and generates the operation selector;

computing, using a column selector network, a column selector by combining the query with a weighted operation embedding different from the operation embedding, wherein the column selector represents a probability distribution over one or more headers of the table, and wherein the column selector network takes a combination of the query with the weighted operation embedding as input and generates the column selector;

generating, using an operation network, a first attention vector based on a first input and a second attention vector based on a second input different from the first input, wherein the first attention vector is generated using a first attention head of the operation network, the first input includes the query and the one or more headers of the table, the second attention vector is generated using a second attention head of the operation network, and the second input includes the query and a plurality of cells of the table, and wherein the operation network takes the query, the one or more headers of the table, and the plurality of cells of the table as input and generates an operation output based on the first attention vector and the second attention vector;

computing, using a row selector network, a row selector based on the operation selector, the column selector, the first attention vector, and the second attention vector, wherein the row selector network takes the operation selector, the column selector, the operation output as input and generates the row selector;

computing, using an answer component, a probability value for a cell in the table based on the row selector and the column selector, and wherein the answer component takes the row selector as input and generates the probability value for the cell;

computing a loss function based on the probability value and a ground truth answer; and updating parameters of a neural attention network based on the loss function.

16. The method of claim 15, further comprising:
generating an operation output for each cell of the table;
weighting the operation output based on the operation selector and the column selector; and
summing the weighted operation output over an operation index and a column index to produce the row selector.

17. The method of claim 16, wherein:
the operation output is based on the first attention vector and the second attention vector.

18. The method of claim 15, further comprising:
encoding the one or more headers and the plurality of cells from the table to produce encoded headers and encoded cells, wherein the first attention vector is computed based on the encoded headers and the second attention vector is computed based on the encoded cells.

19. The method of claim 18, wherein:
each of the encoded headers and each of the encoded cells comprises a word embedding and a knowledge graph embedding.

* * * * *